Feb. 27, 1968  A. J. KANE  3,370,332
CONICAL MILLING CUTTER
Original Filed April 26, 1963  3 Sheets-Sheet 1
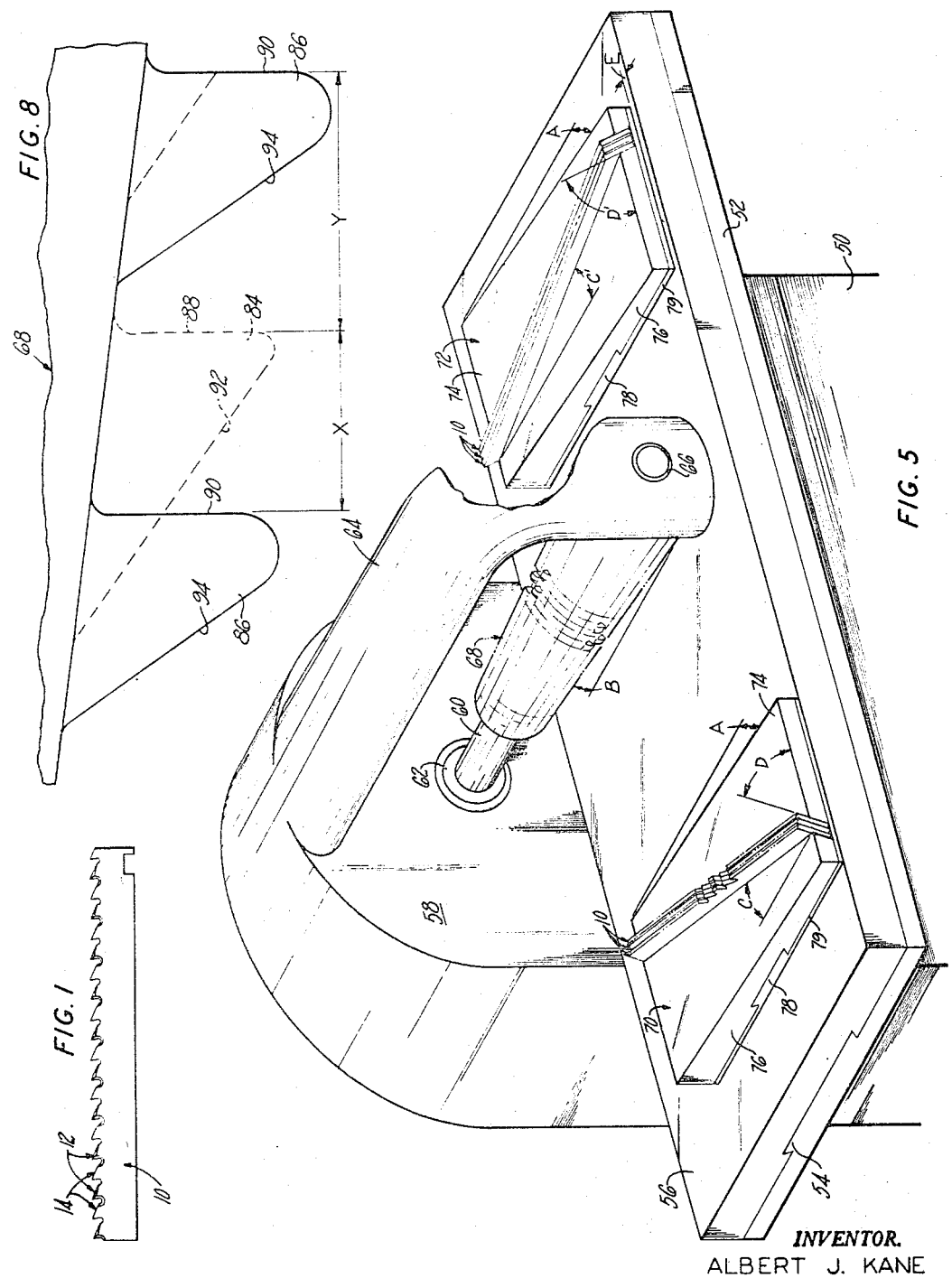
INVENTOR.
ALBERT J. KANE
BY Lindsey, Prutzman and Hayes
ATTORNEYS Feb. 27, 1968  A. J. KANE  3,370,332
CONICAL MILLING CUTTER
Original Filed April 26, 1963  3 Sheets-Sheet 2
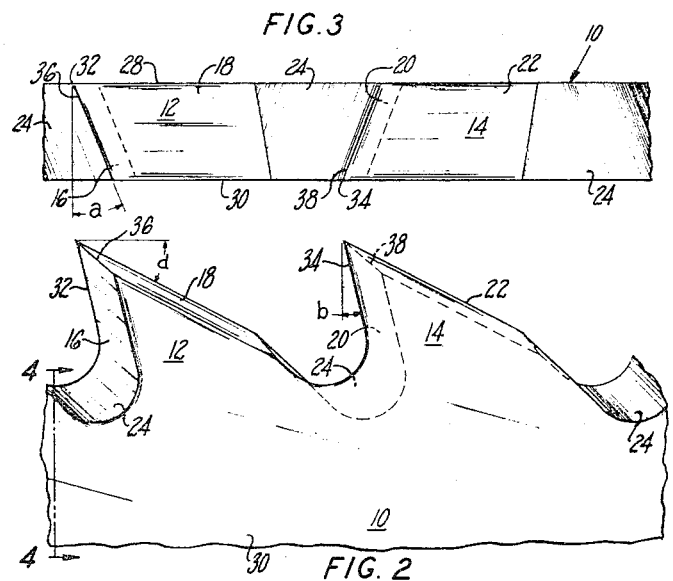
FIG. 3
FIG. 2
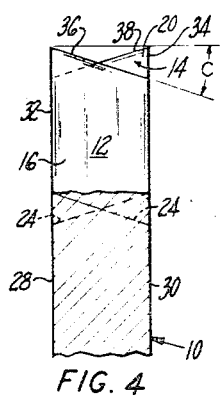
FIG. 4
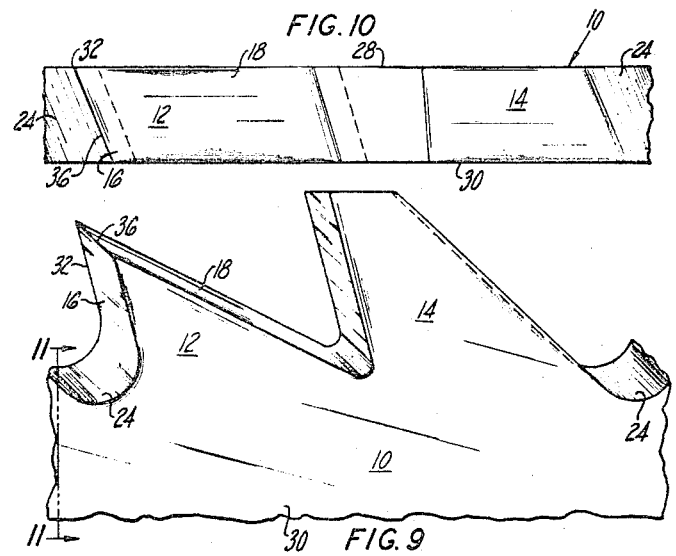
FIG. 10
FIG. 9
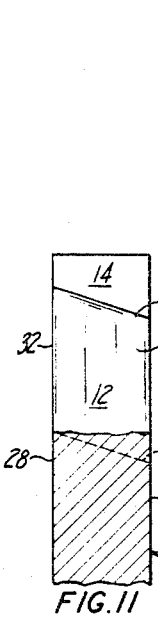
FIG. 11
INVENTOR.
ALBERT J. KANE
BY Lindsey, Prutzman and Hayes
ATTORNEYS

United States Patent Office 3,370,332
Patented Feb. 27, 1968

3,370,332
CONICAL MILLING CUTTER
Albert J. Kane, Rockville, Conn., assignor to The Capewell Manufacturing Company, Hartford, Conn., a corporation of Connecticut
Application Mar. 11, 1965, Ser. No. 446,766, now Patent No. 3,331,265, dated July 18, 1967, which is a continuation of application Ser. No. 275,816, Apr. 26, 1963. Divided and this application June 2, 1967, Ser. No. 643,166
8 Claims. (Cl. 29—103)

ABSTRACT OF THE DISCLOSURE

A conical milling cutter for manufacturing saw blades having burr-free teeth with fully milled cutting edges and a positive forward rake wherein the cutter is provided with identical teeth arranged in longitudinal and peripheral rows and identical teeth of a different tooth form arranged in alternate longitudinal and peripheral rows with unequal distance between each longitudinal row of teeth and the longitudinal row of teeth on each side of it.

---

This application is a division of my copending application Ser. No. 446,766 filed Mar. 11, 1965, which in turn is a continuation of my prior application Ser. No. 275,816 filed Apr. 26, 1963, now abandoned.

The present invention relates to an improved and novel apparatus for milling the teeth of the saw blades.

An object of this invention is to provide novel apparatus for manufacturing saw blades having burr-free saw blades with milled cutting edges which may be quickly and inexpensively produced.

Another object of this invention is to provide an improved milling cutter for milling the teeth on a blank to form a saw blade. Included in this object is the provision of a novel conical milling cutter having a plurality of axial rows of milling teeth with the teeth in adjacent rows having different tooth forms and being staggered relative to each other.

Still another object of this invention is to provide novel apparatus for manufacturing saw blades wherein the gullet between adjacent teeth is enlarged for a given tooth size to provide an increased volume for chips between adjacent teeth to reduce substantially the possibility of chips jamming the saw.

Other objects will be in part obvious and in part pointed out more in detail hereinafter.

The invention accordingly consists in the features of construction, combination of elements and arranged of parts which will be exemplified in the construction hereafter set forth and the scope of the application of which will be indicated in the appended claims.

In the drawings:

FIG. 1 is a side view of a portion of a saw blade produced by the milling cutter of this invention;

FIG. 2 is an enlarged fragmentary side view of the saw blade of FIG. 1 showing in detail its novel tooth construction;

FIG. 3 is a top view of the teeth shown in FIG. 2;

FIG. 4 is a partial vertical cross section taken along line 4—4 of FIG. 2;

FIG. 5 is a milling machine utilized in the practice of this invention;

FIG. 8 is an enlarged schematic view showing the details of construction of the cutting teeth of the milling cutter of FIG. 6;

FIG. 9 is an enlarged fragmentary side view showing the teeth of a saw blade produced by the milling cutter of this invention at an intermediate stage of manufacture;

FIG. 10 is a top view of the teeth shown in FIG. 9;

FIG. 11 is an end view taken along the line 11—11 of FIG. 9; and

Figure 6:
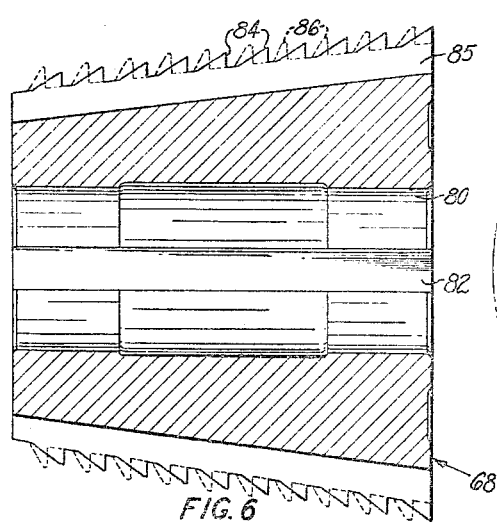
FIG. 6 is a schematic view in cross section of the novel conical milling cutter of this invention.

Referring now more specifically to the drawings wherein like parts are designated by like numerals throughout the various figures, a saw blade 10 made in accordance with this invention is shown in FIG. 1. The saw blade 10 is preferably constructed of carbon or high-speed steel which may be heat treated if desired after the teeth have been formed as hereinafter described. The saw blade 10 includes a plurality of cutting teeth 12, 14 along one longitudinal edge thereof.

Referring particularly to FIGS. 2, 3 and 4, the cutting tooth construction resulting from the practice of this invention is illustrated. Since alternate teeth are formed in the same manner, only two adjacent teeth 12, 14 will be described in detail. Each tooth 12 has a leading face 16 and a trailing face 18, and each tooth 14 includes a similar leading face 20 and a trailing face 22. As best shown in FIG. 2, the leading faces 16, 20 extend outwardly from the root of the tooth and generally normal to the longitudinal axis of the blade. The trailing faces 18, 22 are inclined to and intersect the leading faces 16, 20, respectively, to form cutting edges 36, 38. The leading faces 16, 20 merge with an arcuate surface at the root of the tooth to form gullets 24 between the teeth. The forward edge of the arcuate surface forming the gullets 24 intersects the trailing faces 18, 22 at 26. It will be observed that the arcuate surface forming the gullet 24 at the root of the teeth extends below the plane of trailing faces 18, 22 while the leading faces 16, 20 tangentially merge into the surface forming the enlarged gullet 24. It will thus be seen that a saw blade made by the milling cutter of this invention incorporates an enlarged chip-receiving gullet 24 in a saw blade in which the surfaces of the teeth are formed entirely by milling as hereinafter more fully described.

The leading faces 16, 20 of teeth 12, 14 are disposed nonperpendicularly relative to the sides 28 and 30 of the saw blade so as to provide an oblique fleam angle $a$ as best shown in FIG. 2, and provide alternate cutting edges 32, 34 on opposite sides of the saw blade 10 in order to provide a clean-sided cut or kerf in the workpiece being severed. Also, as best shown in FIGS. 2 and 3, the leading faces 16, 20 of teeth 12, 14 are disposed rearwardly of a perpendicular to the longitudinal axis of the blade 10 by an angle $b$ to provide a positive front rake for the tooth, and the trailing faces 18, 22 of the teeth are formed at an oblique angle $c$ with the sides of the saw blade 10 and at an oblique angle $d$ with the edge of the blade to provide a clearance or back rake for the teeth and to incline terminal cutting edges 36, 38 at an angle to the workpiece for efficient cutting action. Since the leading faces 16, 20 as well as the trailing faces 18, 22 of teeth 12, 14 respectively, are each milled, as hereinafter more fully described, the cutting edges 32, 34, 36 and 38 are each sharpened along their full length in contrast to current practices in which the point only is sharp with the result that the saw blade of this invention will cut the workpiece more rapidly and has a longer life.

If desired, the teeth 12, 14 may, after being formed by milling, be alternately set or deformed laterally from the plane of the tooth dependent upon the intended use of the saw blade.

Referring now to FIG. 5, there is shown a milling machine incorporating the milling cutter of this invention. As shown, the milling machine comprises a supporting base 50 having mounted thereon a stationary platform 52 which is provided with a longitudinal dovetail guide rail 54 which cooperates with a complementary dovetail groove of table 56 to guide the table 56 for longitudinal movement on the platform 52. Platform 52 may be powered for longitudinal movement in both directions by any suitable means, not shown.

Laterally disposed relative to the table 56 is a housing 58 for the power train, not shown, of the milling machine. A powered arbor or shaft 60 is rotatably mounted in bearing 62 of housing 58 so as to extend laterally across the table 56 and is connected to the output of the power train in a conventional manner. Laterally extending from the housing 58 above the arbor 60 is a stationary support arm 64 which has a downwardly depending portion which serves as a tail stock for supporting the outer end of the arbor 60 in a bearing 66. Mounted on the arbor 60 is the conical milling cutter 68 of this invention, which is shown schematically in FIG. 5. The milling cutter 68 is secured to the arbor 60 by any conventional means, not shown, so as to rotate therewith.

As shown in FIG. 5, a pair of vises 70, 72 are fixedly mounted by any conventional means, not shown, at the ends of the table 56. The vises 70, 72 are each provided with relatively movable jaws 74, 76. It will be observed that the jaw 76 of each of the vises is mounted for movement along the longitudinal axis of the table by being slidably mounted on a dovetail guide rail 78 on the stationary base 79 of the vise which engages a mating dovetail slot of the jaw 76. The jaws 74, 76 of the vises 70, 72 may be moved toward and away from each other and secured in any adjusted position for holding a plurality of blanks for saw blades 10 in side-by-side relationship by any conventional means, not shown.

The vises 70, 72 are constructed and arranged so as to hold the saw blade blanks 10 in a preselected compound angular relationship relative to the milling cutter 68 and the table 56. Each of the vises is constructed so as to raise one end of the blanks for saw blades 10 at an acute angle A relative to the table 56. Since the table 56 is movable longitudinally in a plane parallel to the longitudinal axis of the milling cutter 68 and the arbor 60, the angle A results in the upper end of the blades, as viewed in FIG. 5, being raised in a direction so as to converge in the direction of convergence of the milling cutter. As previously indicated, the milling cutter is conical in shape, and its outer surface is provided with a taper angle B. Taper angle B is equal to angle A at which the blanks of saw blades 10 are secured relative to table 56.

It will further be observed that the vises 70, 72 each hold the blanks for saw blades 10 at oblique angles C, C', respectively, relative to the longitudinal axis of the table 56. The angles C, C' are equal but opposite angles relative to the longitudinal axis of the milling cutter, The vises 70, 72 also hold the blanks for saw blades 10 in a position in which they are turned on their own longitudinal axis by a preselected amount relative to perpendiculars to the top surface of table 56, as indicated by the angles D, D'. Angles D, D' are equal but opposite angles relative to perpendiculars to the top surface of the table 56.

Figure 7:
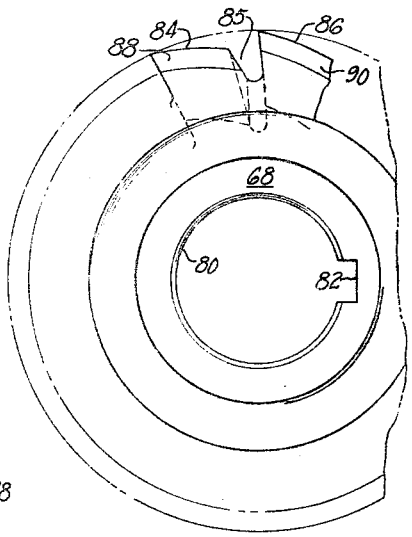
FIG. 7 is a fragmentary end view shown partly in phantom of the milling cutter of FIG. 6.

Turning now to FIGS. 6, 7 and 8, there is shown the unique milling cutter made in accordance with this invention. The milling cutter, which is generally indicated by the numeral 68, is provided with a central bore 80 which is provided with a longitudinal keyway 82 for non-rotatably holding the milling cutter on the arbor 60. The outer peripheral surface of the milling cutter is shown as being in the form of a truncated cone and has a plurality of peripheral rows of cutting teeth 84, 86 thereon. Each of the teeth 84 are identical in shape and are arranged in a plurality of rows of teeth about the periphery of the milling cutter with each of such rows in a plane perpendicular to the longitudinal axis of the cutter. In like manner, each of the teeth 86 are identical in shape and are arranged in a plurality of rows about the periphery of the cutter with each of such rows being in a plane perpendicular to the longitudinal axis of the cutter. It will also be noted that the teeth 84 and the teeth 86 are of different configurations, as best shown in FIG. 8, and the rows of teeth 84 and the rows of teeth 86 are alternated longitudinally along the periphery of the milling cutter 68. Further, as shown in FIG. 7, the teeth 84 are arranged in longitudinal rows, and the teeth 86 are also arranged in alternate longitudinal rows disposed between each pair of rows of teeth 84. A longitudinal chip groove 85 is provided to space each of the longitudinal rows of teeth.

Referring now particularly to FIG. 8, there is shown a schematic representation of the teeth 84, 86 in which, for purposes of clarity of illustration, the teeth 86 are shown in solid lines and the teeth 84 are in dotted lines. While, as heretofore explained, the teeth 84 are arranged in longitudinal rows which are alternated with the longitudinal rows of teeth 86, the representations of the teeth 84 have been advanced to the same plane as the teeth 86.

It will be observed that the leading edge 88 of the tooth 84 and the leading edge 90 of the tooth 86 of the milling cutter are disposed perpendicularly to the longitudinal axis of the cutter. It will also be observed that the trailing edge 92 of the tooth 84 and the trailing edge 94 of the tooth 86 are disposed at an oblique angle to the longitudinal axis of the cutter, although the included angles between the leading and trailing faces of the teeth 84 and 86 are different for purposes hereinafter more fully described. The length of the leading edge 90 of the tooth 86 is greater than the radial length of the leading edge 88 of the tooth 84 and the arcuate tip of the tooth 86 has a greater radius than the arcuate tip of tooth 84.

While the peripheral rows of teeth 84, 86 are alternated, leading cutting edges 88 and 90 are not equally spaced longitudinally of the axis. As shown in FIG. 8, the distance X is less than the distance Y for purposes hereinafter described.

To make saw blades by the use of the milling cutter of this invention, a plurality of blanks for saw blades 10 are gripped in side-by-side relationship in one of the vises 70, 72, say vise 70, at a compound angular disposition as indicated in FIG. 5. The table 56 is then moved longitudinally along the guide rail 54 of the milling machine past a rotating milling cutter 68, as shown in FIGS. 6-8. As the teeth 84, 86 of the milling cutter engage the blanks for the saw blades 10, they fully form alternate teeth 12 as shown in FIGS. 9, 10 and 11 and finish mill the leading face 16 and the trailing face 18 thereof and rough mill teeth 14. In addition, the tip of milling teeth 86 form alternate enlarged gullets 24 between the teeth.

It will be observed in FIG. 10 that the leading and trailing faces of the rough-milled tooth 14 is disposed at the same oblique angle as the corresponding finish milled faces of the tooth 12. However, due to the relative longitudinal distance between X and Y as well as the relatively acute angle of the trailing edge 94 of the milling cutter tooth 86 (FIG. 8) to the leading edge 90 thereof, adequate stock is left on the leading face of the rough-milled saw blade teeth 14 so that the teeth 12, 14 are equidistantly spaced in the finished product as indicated in FIG. 2. In this regard, it will be noted in FIG. 8 that the leading edge 90 of the milling cutter tooth 86 and the trailing edge 92 of the milling cutter tooth 84 finish mill the tooth 12 during the first pass of the blanks for saw blades 10 past the milling cutter. It will also be noted that because of the alternate placing of the longitudinal rows of milling cutter teeth 84 and milling cutter teeth 86 about the periphery of the milling cutter 68, this finish milling is accomplished by the alternate engagement of the cutting edge 90 of the milling cutter tooth 86 and the cutting edge 92 of the milling cutter tooth 84 to provide a burr-free extremely sharp cutting edge along the entire length of all the cutting edges of the tooth.

After the alternate teeth 12 are finished milled in a first pass test the milling cutter 68, as indicated above, the blanks for saw blades 10 are moved longitudinally relative to the longitudinal axis of the milling cutter by one tooth pitch and supported at a changed compound angle relative to the milling cutter preparatory to a second pass test the milling cutter. In the apparatus shown in FIG. 5, this is accomplished by mounting the vise 72 at a distance E, which is equivalent to one tooth pitch, from the edge of the milling table 56. It will be observed that the vise 70 is placed at the edge of the table 56, and, thus, the result is that the partially milled saw blades 10 are advanced one tooth pitch in the direction of the longitudinal axis of the milling cutter. The vise 72 also changes the angular disposition of the blades relative to the axis of the milling cutter and about their own axis by the angles of C' and D' which are equal and opposite to the angles C and D at which the blanks for the saw blades 10 were held during the first pass past the milling cutter. However, the angle A at which one end of the partially finished saw blades 10 are tipped up remains the same as during the first pass.

Figure 12:
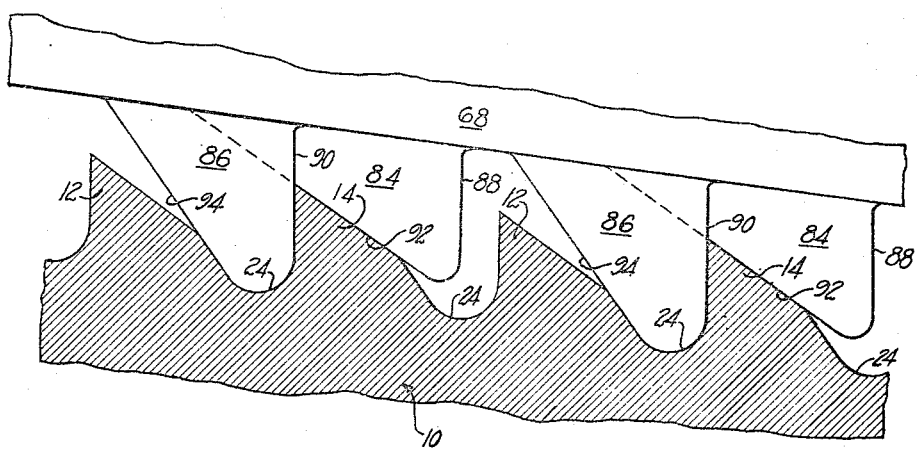
FIG. 12 is an enlarged fragmentary view illustrating one aspect of the milling of teeth in accordance with this invention.

The partially milled saw blades 10 are then moved past the milling cutter 68 in a second pass, at which time the rough-milled teeth 14 are finished milled as indicated in FIG. 12 and the alternate gullets 24 are formed by the tip of milling cutter teeth 86 to complete the milling of the saw blade 10.

From the foregoing, it will be apparent that the milling cutter of this invention may be utilized for the finish milling of an extremely sharp burr-free saw blade having a positive forward rake and enlarged gullets between the teeth by the use of a novel method of holding the blanks at predetermined compound angles relative to a conical milling cutter. It may be accommodated by the changing of the amount of positive forward rake of the teeth without changing the cutter by changing the angles at which the saw blade blanks are held during the milling operation. In this regard, the positive forward rake may be made greater than the taper of the milling cutter. For example, the use of a milling cutter having a 7½° taper with a blade being turned 20° (angles D, D') and swung (angles C, C') 20° produces a saw blade having 13½° positive rake. In addition, this invention also provides a means for milling a positive rake on a saw blade using a milling cutter having forward cutting edges which are perpendicular to its axis. The significance of this will be appreciated when it is considered that in conventional milling methods, the use of the similar teeth on a milling cutter can produce only a positive rake equal to the taper of the cutter.

As will be apparent to persons skilled in the art, various modifications and adaptations of the structure above-described will become readily apparent without departure from the spirit and scope of the invention, the scope of which is defined in the appended claims.

I claim:

1. A conical milling cutter having a plurality of axial rows of teeth disposed along the outer surface thereof, the teeth in one row being offset in the plane of rotation of the cutter relative to the teeth in the next adjacent row with the teeth in alternate rows being aligned in the plane of rotation of the cutter, the teeth in alternate rows having one tooth form and the teeth in the remaining rows having a different tooth form.

2. A conical milling cutter as defined in claim 1 wherein each of said teeth providing a face disposed in a plane perpendicular to the axis of the cutter and a second face longitudinally thereof, the second face of the teeth in adjacent rows being disposed at different angles relative to the axis of the cutter.

3. A conical milling cutter as recited in claim 2 wherein the teeth in adjacent rows terminate a different radial distance from the axis of the cutter.

4. A conical milling cutter as recited in claim 2 wherein the teeth in adjacent rows terminate a different radial distance from the axis of the cutter and in tips of different radii.

5. A conical milling cutter having a plurality of peripheral rows of teeth disposed along the outer surface thereof, the teeth in one peripheral row being axially offset relative to the teeth in the next adjacent row with the teeth in alternate rows having different tooth form and terminating in cones of revolution positioned different radial distances from the axis of the cutter.

6. A conical milling cutter as recited in claim 5 wherein the teeth terminate in curved tips with the tips of teeth in alternate rows having different radii.

7. A conical milling cutter as recited in claim 6 wherein the teeth have tips of larger radii terminating in the larger cone of revolution of the cutter.

8. A conical milling cutter as recited in claim 7 wherein the axial distance between the peripheral rows of teeth terminating in the larger cone of revolution of the cutter and the next adjacent peripheral row of teeth in the direction of convergence of the conical milling cutter is greater than the axial distance between said next adjacent peripheral row of teeth and the following peripheral row of teeth in the same direction.

References Cited

UNITED STATES PATENTS 1,954,535   4/1934   Olsson _____ 75—45

FOREIGN PATENTS 171,444   5/1952   Austria.

HARRISON L. HINSON, *Primary Examiner.*